United States Patent [19]

Majewski

[11] Patent Number: 4,503,953

[45] Date of Patent: Mar. 12, 1985

[54] ROLLER RETAINER FOR BRAKE ASSEMBLY

[75] Inventor: Lawrence M. Majewski, Sterling Heights, Mich.

[73] Assignee: Rockwell International Corporation, Pittsburgh, Pa.

[21] Appl. No.: 515,837

[22] Filed: Jul. 21, 1983

Related U.S. Application Data

[63] Continuation of Ser. No. 269,293, Jun. 1, 1982, abandoned.

[51] Int. Cl.³ .................... F16D 51/22; F16F 1/00
[52] U.S. Cl. .................... 188/330; 188/332; 267/182; 403/155
[58] Field of Search ............. 188/329, 330, 332, 339, 188/343, 250 C; 267/182, 160; 192/75, 76, 103 B, 105 CD, 105 CE; 74/569; 403/155

[56] References Cited

U.S. PATENT DOCUMENTS

| | | | |
|---|---|---|---|
| 2,660,465 | 11/1953 | Gerson | 267/182 |
| 2,710,076 | 6/1955 | Russell | 74/569 |
| 2,781,868 | 2/1957 | House | 188/330 |
| 2,963,732 | 12/1960 | Kramesak, Jr. et al. | 267/182 |
| 3,114,437 | 12/1963 | House | 188/329 |
| 3,275,103 | 9/1966 | Lyon | 188/332 |
| 4,206,834 | 6/1980 | Williams | 188/206 A |

Primary Examiner—Bruce H. Stoner, Jr.
Assistant Examiner—Robert J. Oberleitner

[57] ABSTRACT

A roller retainer for retaining a cam following roller in a pair of laterally aligned open-ended recesses provided at adjacent ends of a pair of axially spaced brake shoe webs comprising a length of spring wire formed to provide a pair of spaced substantially parallel legs, a bridge portion joining the legs and a U-shaped ear at the junction of each leg and the bridge. Each of the legs has an end formed to encircle at least 180° of a trunnion surface of the roller and the bridge portion is of a length greater than the space between the legs and is formed to permit resilient deformation of the bridge while moving the ears toward one another whereby the retainer may be readily deformed to engage or disengage the ears with laterally aligned apertures provided to the spaced brake shoe webs.

6 Claims, 6 Drawing Figures

ROLLER RETAINER FOR BRAKE ASSEMBLY

This application is a continuation of application Ser. No. 269,293, filed June 1, 1981, now abandoned.

BACKGROUND OF THE INVENTION

1. Field of the Invention

The present invention is directed to an improvement in a vehicle brake mechanism, and more specifically, to a roller retainer for a cam actuated brake assembly.

The invention is particularly useful in a brake assembly of the type disclosed in U.S. Pat. No. 4,206,834. That brake assembly includes a pair of brake shoes having adjacent ends pivotally mounted to a support and a rotatable actuating cam disposed between the other ends of the brake shoes. A roller-type cam follower is provided between each of those other ends of the brake shoes and the actuating cam. The roller-type cam followers are seated in open-ended recesses provided to the brake shoes. Rotary movement of the actuating cam is applied to the roller-type cam followers which causes their respective brake shoes to pivot outwardly about their pivot or anchor pins to contact the inwardly facing friction surface of a brake drum.

The roller-type cam followers are comprised of a stepped cylindrical steel pin having a center portion which bears against the actuating cam and smaller diameter end portions which serve as trunnions seated in open-ended recesses provided to the spaced parallel webs of a dual web brake shoe. Under normal conditions, the roller-type cam follower is trapped between the open-ended recesses provided to the dual web brake shoe and the bearing surface of the actuating cam and held in that arrangement by the brake return spring. However, the brake assembly is comprised of a number of different parts and it is also advantageous to maintain the cam followers in the recesses provided to the brake shoes during assembly and disassembly of the brake mechanism for repair purposes. This limits the number of parts the mechanic has to be concerned with at any given time and the possibility of dropping or misplacing the cam follower rollers.

Means for retaining a roller in the open recesses provided to the ends of a brake shoe is also beneficial during extremely cold weather when the brake shoes may freeze to the surrounding drum and, if and the drum clearance is not properly adjusted and the roller is not retained, the rollers may become displaced from their intended position when the cam is rotated to release the brake.

It is also desirable for assembly and maintenance purposes if the roller retaining means allow the cam-follower rollers to be applied and removed without the use of any tools and without requiring the mechanic to manually move component parts between the cam and the roller followers while the return spring is under tension.

2. Description of the Prior Art

U.S. Pat. No. 3,114,437 disclosed one method of retaining a roller-type cam follower in the open-ended recesses provided to brake shoes. In that patent, the mouth of the open-ended recesses is formed to retain the ends of the rollers and a tool such as a screw driver may be required to remove the rollers from the brake shoes.

Spring means and clip devices have also been employed to retain a roller relative to its brake shoe during transfer and assembly. A spring clip is disclosed in U.S. Pat. No. 3,275,103. Wire spring devices are disclosed in U.S. Pat. No. 2,781,868 and application Ser. No. 306,574 filed on Sept. 28, 1981, as a continuation of Patent Application Ser. No. 108,447 filed on Dec. 31, 1979, now abandoned and assigned to the assignee of the present invention.

SUMMARY OF THE INVENTION

The present invention is a roller retainer for a vehicle brake assembly comprising a member formed from a length of spring wire to provide a pair of substantially parallel legs, a bridge portion joining the legs and a U-shaped ear at the junction of each leg and the bridge. The end of each leg distant from the bridge portion is formed to encircle at least and preferably more than 180° of a trunnion surface of a roller and the bridge portion is longer than the space between the legs and is formed to provide resilient deformation of the bridge when moving the ears toward one another, as for example, when the ears are being engaged or disengaged from apertures in the spaced webs of a brake shoe.

The invention and the advantages offered thereby will become apparent from the following detailed description of the embodiment shown by the accompanying drawings.

BRIEF DESCRIPTION OF THE DRAWINGS

In the drawings wherein like reference numerals refer to like parts.

DESCRIPTION OF THE INVENTION

Figure 1:
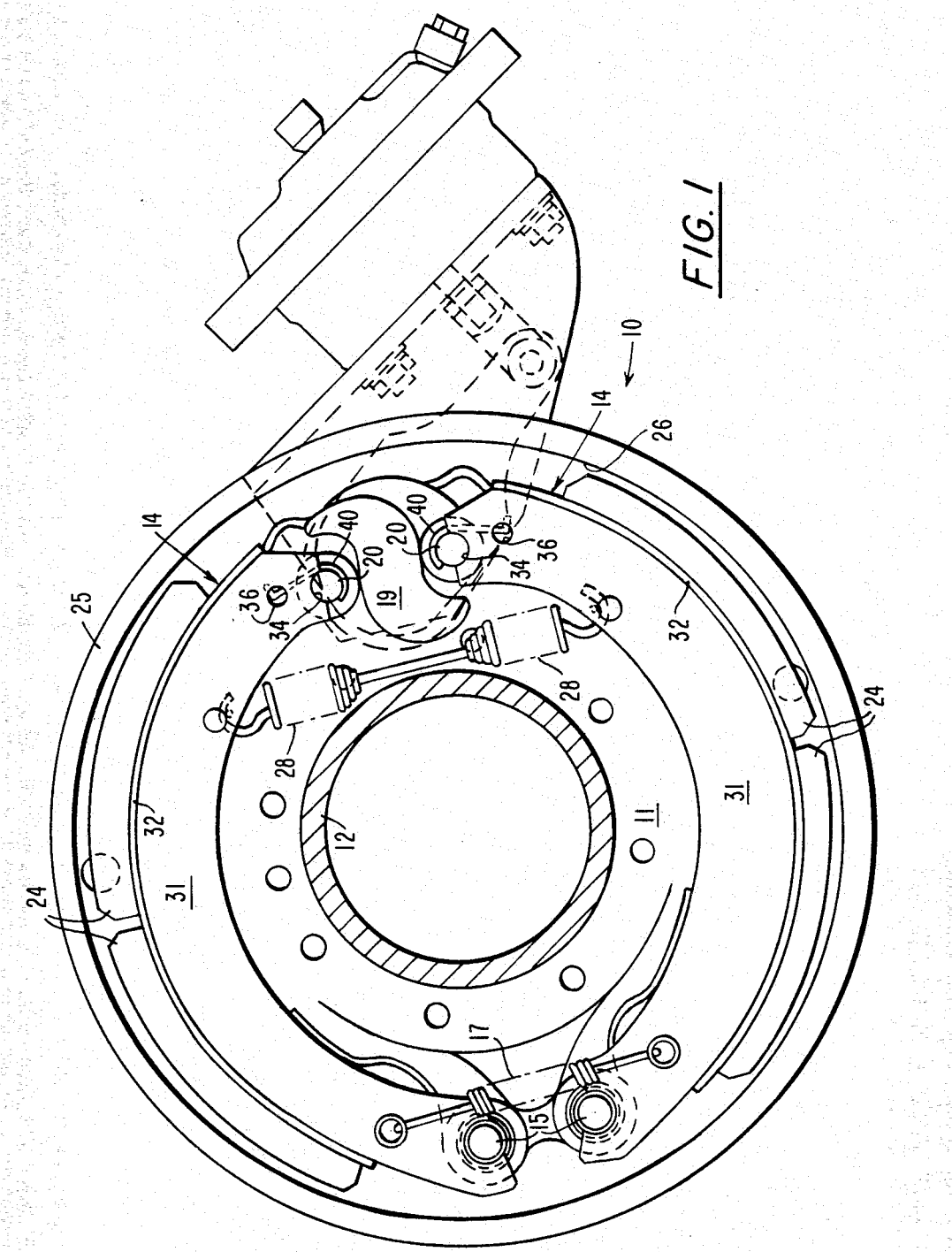
FIG. 1 is a side elevation, partly in section, of a brake assembly according to the present invention.

With reference to the drawings, there is shown a cam actuated brake assembly generally designated by the numeral 10. The brake assembly 10 is supported by a spider 11 rigid with a vehicle axle 12. A cam 19 is mounted for rotary movement between the adjacent ends of the brake shoes 14 opposite from the anchor pins 15. The brake shoes 14 are each provided with a roller-type cam follower 20. The cam is nonrotatably secured to a cam shaft mounted to the spider for rotary movement by conventional means to rock the cam 19 in a clockwise direction through an arc in the range of about 10° to 30°. The cam 19 provides an outwardly directed force to the rollers 20 and the brake shoes 14 which causes the brake shoes to pivot about the anchor pins 15. This movement forces friction lining pads 24 carried by the brake shoes 14 into contact with the inwardly facing friction surface 26 of a brake drum 25 secured by conventional means to a wheel rotatably mounted to a spindle at the outer end of axle 12. When the brakes are released, the brake shoes 14 and the friction lining pads 24 are withdrawn from contact with the brake drum surface 26 by a return spring 28 secured at its opposite ends to the brake shoe webs.

The brake shoes 14 are dual web fabricated brake shoes. That is, each brake shoe includes a pair of axially spaced webs 31 secured to a table 32. The webs 31 are flat in a radial direction and curved in a longitudinal or circumferential direction. The brake shoe table 32 is curved in the circumferential direction and the webs 31 are welded in parallel relation along the interior curved portion of the table. This provides a generally rigid assembly of components parts to which the friction lining pads 24 may be secured by rivets or by chemical bonding.

Figure 2:
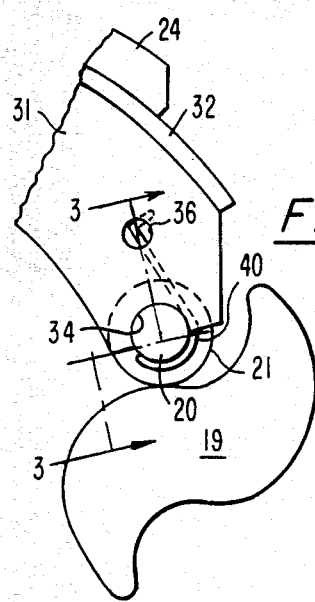
FIG. 2 is an enlarged view of a portion of FIG. 1 showing the roller retainer of the present invention.
Figure 3:
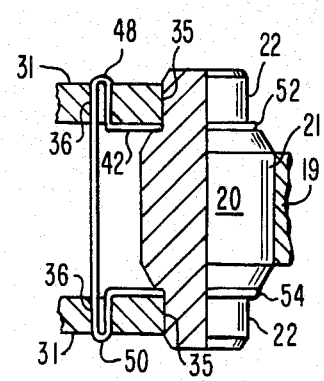
FIG. 3 is a section on line 3—3 of FIG. 2.

Each of the brake shoe webs 31 is provided with an open recess 34 opposite the cam follower 20 and an aperture 36 adjacent each recess 34. The recess 34 is in the form of a slot which includes an inner arcuate bearing surface or journal 35 and a mouth formed by integral brake shoe portions. The recesses are identical and laterally aligned. The bearing surfaces 35 are semicircular bearing surfaces and are adapted to engage a complementary arcuate surface of the generally cylindrical end portion 22 of the cam follower roller 20. As best shown by FIGS. 2 and 3, each cam roller follower 20 is comprised of a cylindrical roller surface 21 located intermediate the brake shoe webs 31 and supported by coaxial reduced diameter cylindrical shaft sections or trunnions 22 seated in the arcuate journal surfaces 35.

Figure 4:
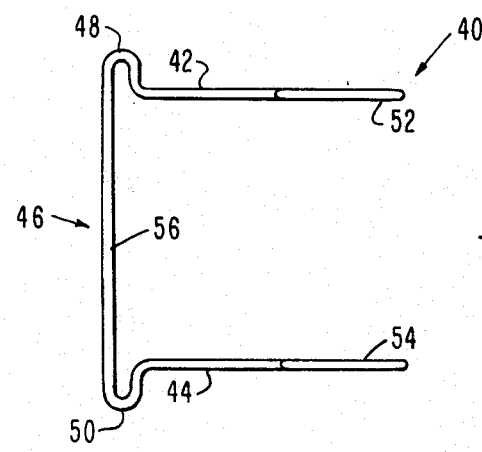
FIG. 4 is a plan view of the roller retainer of the present invention.
Figure 5:
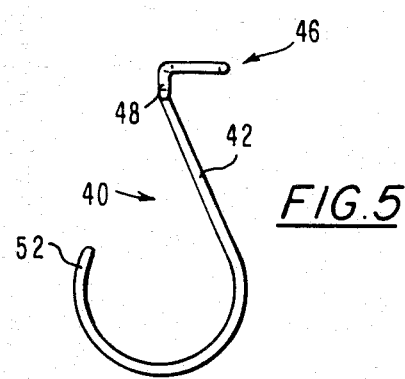
FIG. 5 is a side elevation of the roller retainer of the present invention.
Figure 6:
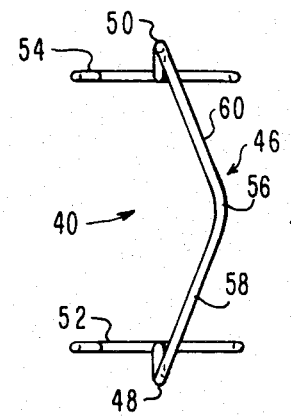
FIG. 6 is an end elevation of the roller retainer of the present invention.

Each roller-type cam follower 20 is retained in its respective recess 34 by a roller retainer 40. As best shown in FIGS. 4–6, the roller retainer is formed from a continuous length of steel spring wire about 0.051 inch dia. The stock wire is cut to a length of about seven inches and formed to provide a retainer comprised of a pair of spaced substantially parallel legs 42, 44; a bridge portion 46 joining the legs 42, 44; a U-shaped ear 48 at the junction of leg 42 with bridge portion 46; and a U-shaped ear 50 at the junction of leg 44 with bridge portion 46. The ends 52, 54 of legs 42, 44, respectively, are arcuately formed to circumferentially enclose an arc of 210° of the circumference of the trunnions 2 of the cam roller follower 20. The bridge portion 46 is longer than the distance between the legs 42 and 44 and, as best shown by FIGS. 2 and 5, the bridge portion 46 and the U-shaped ears 48, 50 are formed to extend in a planes substantially normal to the parallel planes defined by the legs 42 and 44 substantially normal to each other. As shown by FIG. 6, the center of the bridge portion 46 is curved at 56 and joined to the ears 48 and 50 by straight segments 58 and 60 of the spring wire roller retainer 40.

The U-shaped ears 48 and 50 provide interlocking means at the junction of each leg 42, 44 and the bridge portion 46, each of which is seated or engaged in one of the apertures 36 to secure the retainer 40 and the roller trunnions 22 to the brake shoe webs 31.

When the brake assembly 10 is to be dismantled, the drum 25 is withdrawn and one of the brake shoes (preferably the lower shoe) 14 is manually rotated about its anchor pin 15 to expand the return spring 28. The bridge portion 46 of the retainer 40 provided to that brake shoe is then manually pulled to disengage the U-shaped ears 48 and 50 from the apertures 36 by displacing the plane defined by at least one of the legs 42, 44 relative to the plane defined by the other leg to free the roller-type cam follower relative to that brake shoe. The cam follower roller 20 is then withdrawn from that brake shoe. The other brake shoe 14 is then manually rotated about its anchor pin. The bridge portion 46 of the roller retainer 40 associated with that brake shoe is manually withdrawn from between the webs 31 to free the cam follower which is then removed. The brake shoe return spring 28 is free of tension with the roller-type cam followers removed and the spring 28 may be manually withdrawn. One brake shoe, preferably the lower shoe, is then rotated approximately 180° to relieve the tension on and thereby permit removal of the anchor end retaining spring 17. The brake shoes can then be manually withdrawn from the anchor pins and new or relined brake shoes substituted therefor. Except for removal of the brake drum, the brake assembly can be dismantled manually without the use of any tools and without requiring the mechanic to manually move the retainer between the cam 19 and the roller followers 20 while the return spring is under tension which may cause injury to the mechanic's fingers if they are caught between the cam rollers.

The roller retainer 40, as previously described and claimed hereinafter, are disposed so the bridge portion 46 may be readily grasped between the brake shoe webs to disengage the ears 48 and 50 from the apertures 36. The spring wire roller retainer is also less complex than some other roller retainers and is therefore less expensive to manufacture since it does not require as many forming operations.

The invention may also be embodied in other specific forms without departing from the spirit or essential characteristics thereof. The foregoing description is therefore to be considered as illustrative and not restrictive, the scope of the invention being defined by the appended claims, and all changes which come within the meaning and range of equivalency of the claims are therefore intended to be embraced thereby.

What is claimed and desired to be secured by Letters Patent is:

1. A roller retainer for retaining a cam following roller in a pair of laterally aligned open-ended recesses provided at adjacent ends of a pair axially spaced brake shoe webs comprising a length of spring wire formed to provide a pair of spaced substantially parallel legs, each of said legs having an end formed to encircle at least 180° but substantially less than 360° of a trunnion surface of said roller and defining a plane parallel to the other leg, a bridge portion joining said legs and a U-shaped ear at the junction of each leg and said bridge, said bridge portion and said U-shaped ears extending substantially normal to the planes defined by said legs and said bridge portion being of a length greater than the space between said legs and formed to permit resilient deformation of said retainer by manually grasping said bridge portion and displacing at least one of said legs relative to the plane defined by said other leg to engage or disengage said ears with laterally aligned apertures provided to said spaced brake shoe webs.

2. The roller retained defined by claim 1, wherein each of said circular arcs encloses about 210° of said trunnion surfaces.

3. The roller retainer defined by claim 1, wherein the center of said bridge portion is curved and joined to said U-shaped ears by straight segments of said wire.

4. In combination, a brake shoe having a dual web structure, said webs being formed with similar and laterally aligned open-end recesses and an aperture adjacent each of said recesses, a cam follower having a roller intermediate the webs and axially rigid cylindrical trunnions supported in said recesses and a roller retainer comprised of a length of spring wire formed to provide a pair of substantially parallel legs with each leg defining a plane generally parallel to said webs and circumferentially encircling more than half but substantially less than the full circumference of one of said roller trunnions, a bridge portion joining said legs and interlocking means at the junction of each leg and said bridge, said bridge portion and said interlocking means being substantially normal to the planes defined by said legs, each of said interlocking means engaged with one of said apertures to secure said retainer to said brake shoe, said bridge portion being of a length greater than the space between said webs and formed to permit resilient deformatin of said retainer by manually grasping and pulling said bridge portion to displace the interlocking means at the junction of at least one leg and said bridge portion relative to the interlocking means at the junction of said other leg and said bridge portion to disengage said interlocking means from said apertures.

5. The combination defined by claim 4, wherein said interlocking means is comprised of a U-shaped ear formed at the junction of each leg and said bridge.

6. The combination defined by claim 4, wherein each of said legs encircles approximately 210° of one of said roller trunnions.

* * * * *